United States Patent [19]

Lemmens

[11] 3,850,050

[45] Nov. 26, 1974

[54] CONTINUOUSLY VARIABLE AUTOMATIC TRANSMISSION

[76] Inventor: John Lemmens, 248 Rue Mayrand, St. John, Quebec, Canada

[22] Filed: Feb. 6, 1973

[21] Appl. No.: 330,028

[52] U.S. Cl..... 74/689, 74/230.17 M, 74/230.17 E, 74/751, 74/752 E
[51] Int. Cl............................................ F16h 37/08
[58] Field of Search ........ 74/689, 752 E, 230.17 M, 74/230.17 E, 751

[56] References Cited
UNITED STATES PATENTS

| 1,795,135 | 2/1930 | Molly | 74/752 E |
|---|---|---|---|
| 1,797,826 | 3/1931 | Gage | 74/752 E X |
| 2,276,186 | 3/1942 | Getchell | 74/230.17 M |
| 2,889,716 | 6/1959 | Doty | 74/689 |
| 2,974,544 | 3/1961 | Miner | 74/230.17 E |
| 3,340,749 | 9/1967 | Magg et al. | 74/689 |

FOREIGN PATENTS OR APPLICATIONS

| 742,914 | 1/1956 | Great Britain | 74/689 |

Primary Examiner—Samuel Scott
Assistant Examiner—John Reep

[57] ABSTRACT

The invention comprises a continuously variable automatic transmission in which the input shaft drives the planet gear carrier of a planetary gear train, the internal gear being connected to the output shaft and the sun gear being driven by the input shaft through an expansible pulley V-belt drive, the ratio of which is controlled by a centrifugal device driven by the input shaft.

19 Claims, 13 Drawing Figures

}

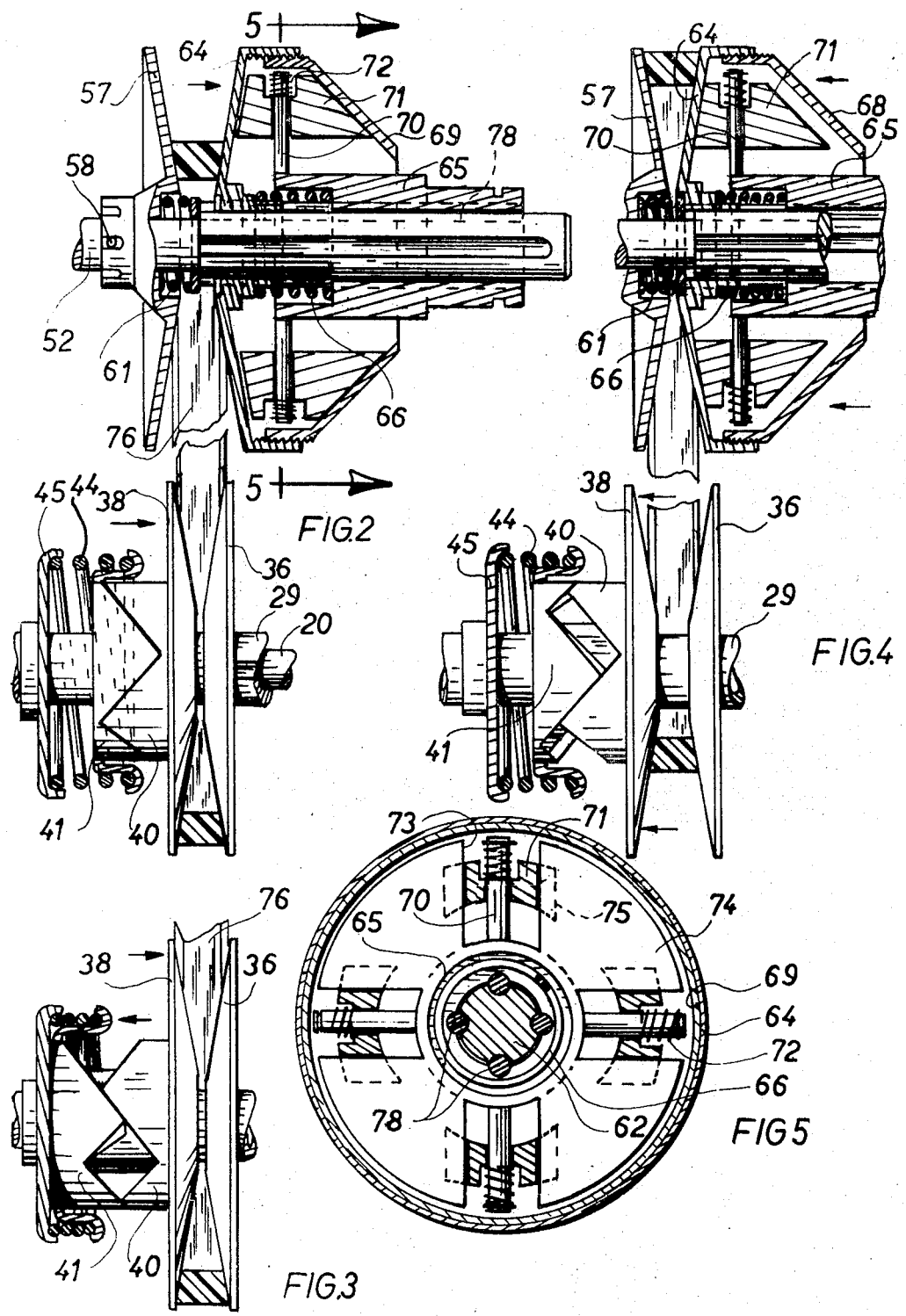

CONTINUOUSLY VARIABLE AUTOMATIC TRANSMISSION

The present invention relates to a continuously variable automatic transmission particularly suitable for small engine vehicles, such as snowmobiles or the like.

The use of planetery gear trains in connection with transmissions is well known. Such planetary gear trains are compact, symmetrical and have a comparatively high power transmitting capacity, since the load is shared by at least three planet gears. For this reason, planetary transmissions are preferred where space is limited, as in small engine vehicles in general, and where weight must be kept to a minimum; however, such transmissions are not continuously variable.

Also known, in connection with vehicles, is the use of expansible pulley V-belt drives, in which the variability control is easily obtained. These drives, however, are liable to slip under heavy load and they are subject to wear.

A continuously variable transmission has been described by the same inventor in U.S. Pat. No. 3,641,843 of Feb. 15, 1972 for "VARIABLE SPEED TRANSMISSION" in which both a V-belt drive and a planetary gear train are used. The main load from the input to the output shaft is carried therein by the planetary gear train, more specifically by the planet gears and the internal gear, and the V-belt drive is used to control the speed of the sun gear to obtain a neutral setting and an infinitely variable range of both forward and reverse speeds. The load on the V-belt drive is thus only a reduced reaction load and is kept low, avoiding slip and minimizing wear. Control of the V-belt drive in the earlier device is manual and thus has the disadvantage of requiring skill and demanding attention.

The present invention provides a transmission of the same general type as the prior patent, but in which the control of the V-belt drive is carried out automatically, the only manual setting required being a choice between neutral, forward or reverse, with possibly two or more ranges of forward, thereby providing a continuously variable fully automatic transmission responsive to load and engine speed.

The continuously variable automatic transmission of the present invention accordingly comprises a planetary gear train having a sun gear, a carrier with a plurality of planet gears meshing with the sun gear and an internal gear meshing with the planet gears, an input shaft operatively connected to the carrier, an output shaft connected to the internal gear, and continuously variable driving means between the input shaft and the sun gear, and is characterized by a centrifugal control means operatively connected to the continuously variable driving means.

More specifically the centrifugal control means comprises a plurality of weights in cam relation with one of the pulleys of a V-belt drive, constituting the continuously variable driving means between the input shaft and the sun gear and a mount radially slidably mounting the weights.

A further feature of the present invention, constituting an improvement over the prior art, is the provision of an automatic centrifugally controlled high and low range selector which cuts in above a given engine speed and preferably cuts out at less than the cut-in speed.

The selector is characterized in that the operative connection between the input shaft and the carrier includes a pair of sprocket wheels connected to the carrier, a unidirectional clutch mounted on the input shaft, a sprocket wheel connected to this clutch, a chain connecting the last-mentioned sprocket wheel to one of the carrier sprocket wheels, a centrifugal clutch mounted on the shaft, a sprocket wheel connected to the centrifugal clutch, a chain connecting the last-mentioned sprocket wheel to the other carrier sprocket wheel, the transmission ratio of the unidirectional clutch sprocket wheel to its associated carrier sprocket wheel being smaller than the transmission ratio of the centrifugal clutch sprocket wheel to its associated carrier sprocket wheel.

This arrangement is such that at low engine speeds the torque is transmitted through the unidirectional clutch, while at high engine speeds the centrifugal clutch cuts in, the unidirectional clutch allowing its sprocket to overdrive the input shaft.

Preferred embodiments of the invention are illustrated by way of example in the accompanying drawings, in which:

FIG. 1 is an axial section of a continuously variable automatic transmission according to a first embodiment of the invention;

FIGS. 2, 3, and 4 are fragmentary sections on the same plane as FIG. 1, showing different positions of the V-belt drive;

FIG. 5 is a cross-section on line 5—5 of FIG. 2;

Figure 1:
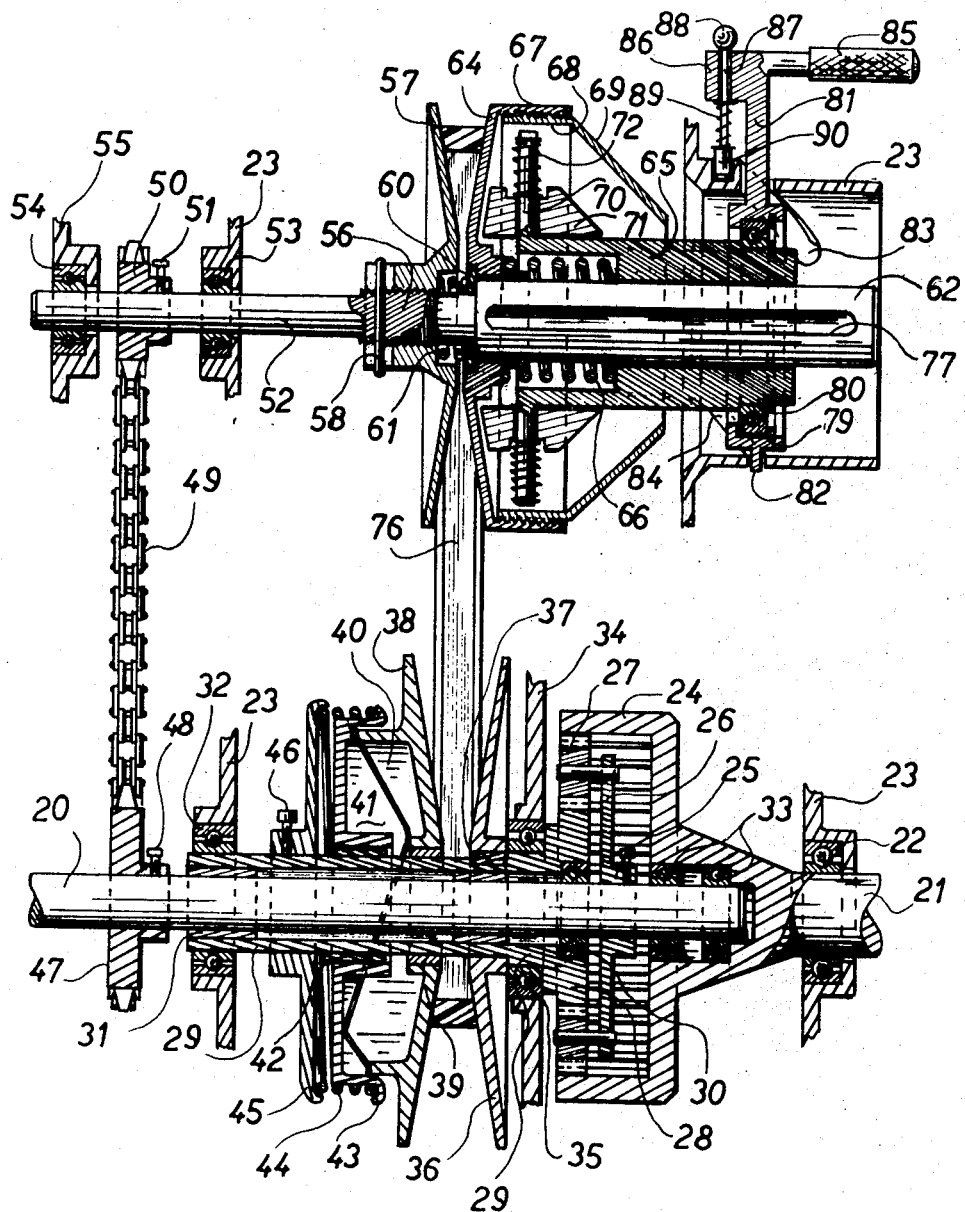

Referring to FIG. 1, the transmission according to the first embodiment comprises an input shaft 20 which is to be connected to an engine (not shown), and an output shaft 21 journalled in a ball bearing 22 mounted in the fragmentally illustrated transmission casing 23. Output shaft 21 is integral with the internal gear 24 of a planetary gear train, also including a carrier 25 fastened to the input shaft 20 and carrying, journalled to its arms 26, three or more planet gears 27 meshing with the internal gear 24.

The planetary gear train further comprises a sun gear 28 meshing with the planet gears 27 and integral with a sleeve 29 journalled on the input shaft 20 by means of a ball bearing 30 at the sun gear end of the sleeve and a sleeve bearing 31 at the opposite end. Said opposite end of the sleeve 29 is also journalled on the transmission casing 23 by a ball bearing 32, which also serves to journal the corresponding portion of input shaft 20. The other end of input shaft 20 is journalled to the internal gear and output shaft unit 24-21 by a pair of ball bearings 33. Adjacent the sun gear 28 the sleeve 29 is further journalled to an internal casing partition 34 by a ball bearing 35 and carries a pulley flange 36 fixed thereon by a key 37.

An opposite pulley flange 38 is slidably and rotatably mounted on the sleeve 29 by a sleeve bearing 39 and has its outer face of cam configuration constituting one element 40 of a torque responsive member, meshing with an other element 41 of the torque responsive member having a similar cam configuration and slidably mounted on the sleeve 29 but fixed rotationally by a key 42. Element 41 has an outwardly projecting circumferential flange 43 which holds a compression coil spring 44 butting against a plate 45 fixed to the sleeve 29 by a screw 46.

The input shaft 20 carries, adjacent the bearing 31 and 32 and externally of the casing 23, a sprocket wheel 47 fixed thereon by a screw 48. A link chain 49 connects sprocket wheel 47 to another sprocket wheel 50 fixed by a screw 51 to an auxiliary shaft 52 which is journalled, on either side of sprocket wheel 50 by means of ball bearings 53 and 54 respectively to the casing 23 and to another fixed element 55 which may be another part of the vehicle structure.

Shaft 52 has a threaded portion 56 on which is screwed a pulley flange 57 axially adjustable on the threaded portion 56 but fixed to the shaft 52 by a pin 58. Beyond pulley flange 57 the auxiliary shaft 52 carries slidable thereon a washer 60 urged by a compression coil spring 61 against the end of an enlarged portion 62 of shaft 52, on which are mounted an opposite pulley flange 64 and a mount 65. The latter is recessed to accommodate a compression coil spring 66 tending to push the pulley flange 64 and the mount 65 apart.

Pulley flange 64 has an integral outer internally threaded collar 67 into which is screwed an externally threaded collar 68 of an additional flange 69. The mount 65 carries four radial shafts 70 on which are slidably mounted weights 71 urged inwardly by springs 72 on the shafts 70. The weights 71 move within radial cutouts 73 (FIG. 5) of a plate 74 secured to the mount 65 and have lateral notches 75 engaging the edges of the cutouts 73 to prevent the weights from rotating on shafts 70. The weights 71 are formed with cam faces on either side engageable with and of the same inclination as the corresponding faces of pulley flange 64 and additional flange 69 respectively. The inclination of additional flange 69 with respect to a plane perpendicular to the shaft 52 is greater than that of pulley flange 64.

A V-belt 76 rides on the expansible pulleys formed by flange pairs 36-38 and 57-64 respectively. It will be noted that in the two pulleys the fixed flanges 36 and 57 are on opposite sides of the V-belt 76, to ensure alignment of the V-belt as the slidable flanges 38 and 64 are displaced.

The enlarged portion 62 of shaft 52 is provided with a plurality of axial keyways 77 and the interior of the hub portion of pulley flange 64 and of the mount 65 are provided with similar keyways (FIG. 5). Rods 78 are located in the matched keyways to mount the pulley flange 64 and the mount 65 on the shaft portion 62 so that they are axially slidable thereon but fixed in rotation therewith.

A ring 79 is mounted through the intermediary of a ball bearing 80 of the end of mount 65 away from the weights 71. The ring 79 has on diametrically opposite sides thereof, radially extending and rigidly connected therewith an arm 81 and a guide pin 82. The arm 81 and the guide pin 82 extend through helical slide slots 83 and 84 respectively of casing 23, which at this location has a tubular form surrounding and coaxial with the shaft portion 62 and the mount 65.

The arm 81 has a handle 85 at its outer end as well as a projecting portion 86 with a hole therethrough containing a pin 87 which has a knob 88 at its outer end and carries a compression coil spring 89 pressing against an enlarged head 90 of pin 87 to urge said pin 87 towards the casing 23. The head 90 is engageable with a recess in the wall of casing 23 adjacent the slide slot 83 for the arm 81.

It is known that in a planetary gear train such as the one illustrated, the speed S of the sun gear 28, I of the internal gear 24 and C of the carrier 25 are related in the following way:

$$I = C(T_I/T_S + 1) - S/T_I/T_S + 1$$

wherein $T_I$ and $T_S$ are the tooth counts of the internal gear 24 and sun gear 28 respectively.

For $I = 0$ it is necessary that $$S = C(T_I/T_S + 1)$$

If $S < C(T_I/T_S + 1)$, then $I > 0$,
while if $S > C(T_I/T_S + 1)$, then $I < 0$, meaning that the internal gear 24 rotates in the opposite direction.

It will be appreciated from the foregoing relationships that the transmission ratio can be set at neutral or continuously varied either in forward or reverse simply by varying the speed of the sun gear 28. As the sun gear speed goes from a low to a high value, the transmission ratio of input to output continuously decreases, goes through a neutral point and then continuously increases in reverse.

Bearing these facts in mind, the transmission according to the first embodiment of the invention operates as follows: input shaft 20 drives carrier 25 causing planet gears 27 to perform planetary motion at a speed constant for any given engine throttle opening. At the same time input shaft 20 drives pulley 57-64 through sprocket wheel 47, chain 49, sprocket wheel 50 and shaft 52-62. Pulley 57-64 drives pulley 36-38 and consequently sun gear 28 through V-belt 76.

The speed of sun gear 28 and consequently the setting and ratio of the transmission are thus controlled by the ratio of the pulleys 57-64 and 36-38. When the pulley flanges 57 and 64 are close together, the V-belt 76 rides at a radially outward position as in FIG. 4, producing high speed rotation of the sun gear 28 causing the output shaft 21 to run in reverse. When the pulley flanges 57 and 64 are far apart, the V-belt 76 rides close to the center as in FIG. 2, producing low speed rotation of the sun gear 28 causing the output shaft 21 to run in forward speed. At an intermediate position of the V-belt 76, an intermediate speed of the sun gear 28 is obtained, causing the output shaft 21 to come to a standstill in what is termed dynamic neutral.

Pulley flanges 36 and 38 adjust automatically to give or take the slack in the V-belt produced by changes in the distance between pulley flanges 57 and 64 and also control to a certain extent said changes through the agency of torque responsive members 40–41 and spring 44 in known manner.

The spacing of pulley flanges 57 and 64 is controlled jointly by the action of weights 71 and by the axial position of mount 65. The latter is manually set by the operator working arm 81 with the handle 85. The arm 81 is rotated with respect to the tubular portion of casing 23 and the helical inclination of slide slots 83 and 84 causes axial movement of ring 79 and consequently of mount 65. The operator can thus select reverse, neutral and one or more forward speed settings. In neutral, the head 90 engages a recess to block the arm 81.

Weights 71 are driven outward to a greater or lesser extent according to engine speed, and depending on the selected setting, they engage either the back of flange 64 to contract pulley 57-64 as in FIG. 4 or additional flange 69 to expand pulley 57-64 as in FIG. 2. In the first case, the action of weights 71 is counteracted by spring 61, while in the second case it is counteracted by spring 66.

Figure 7:
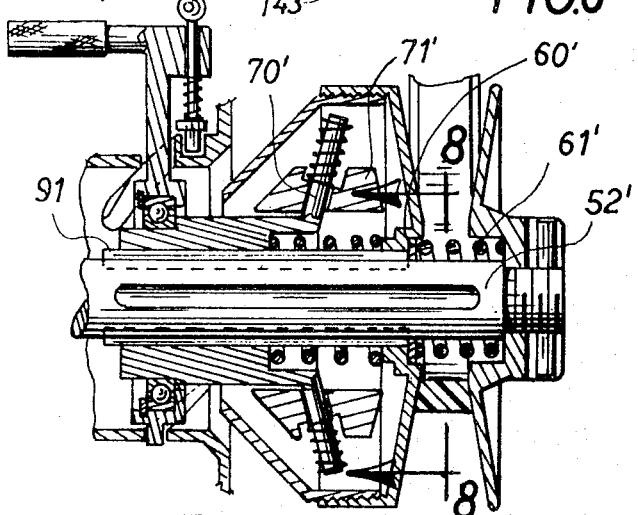
FIG. 7 is a partial axial section of the centrifugal control device of a continuously variable automatic transmission according to a third embodiment of the invention corresponding in other respects to the embodiment of FIG. 1.
Figure 8:
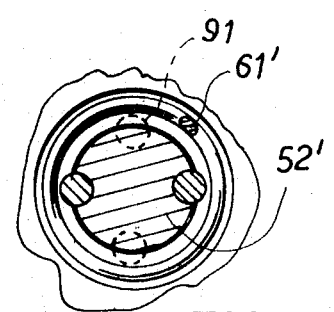
FIG. 8 is a cross-section on line 8—8 of FIG. 7.
Figure 9:
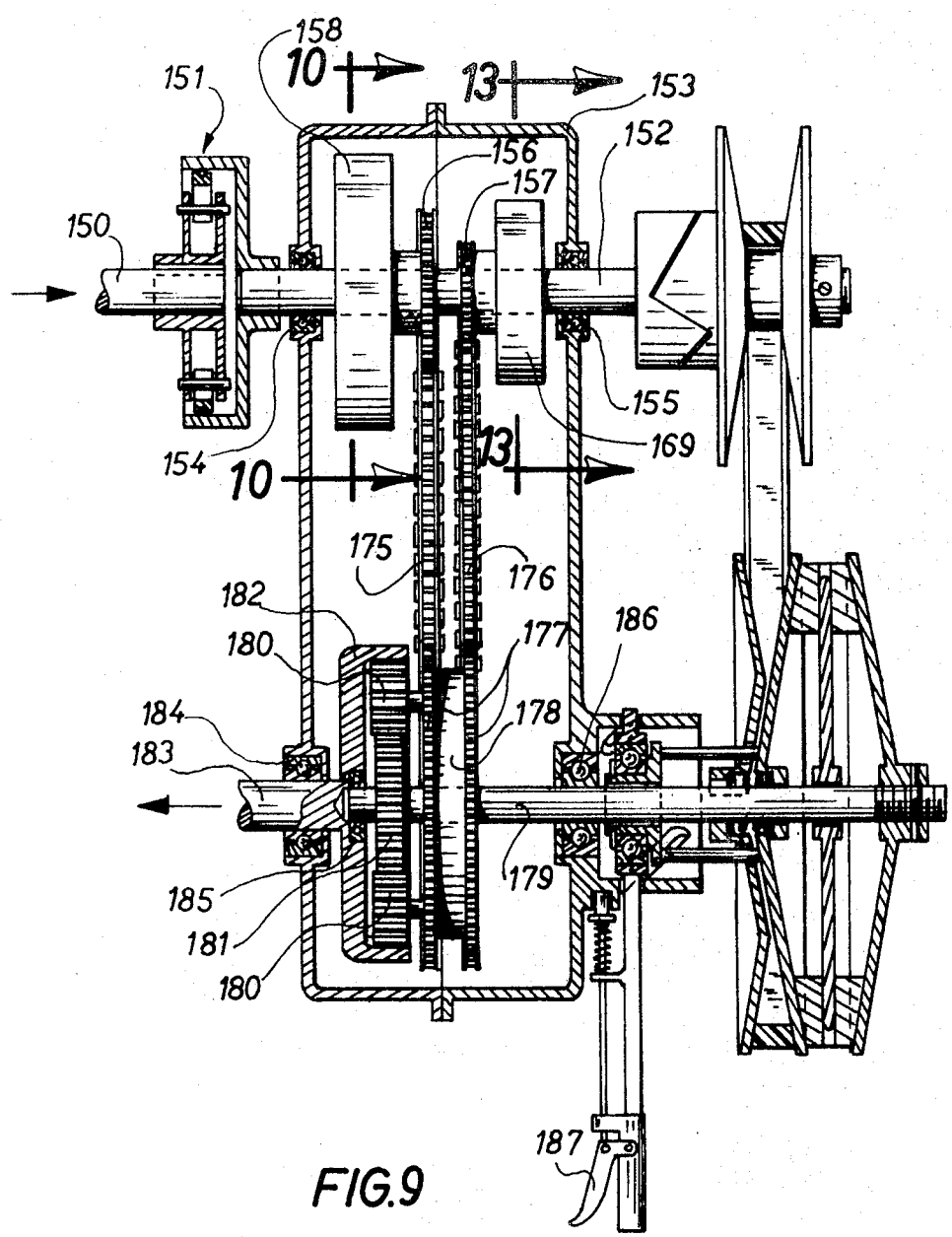
FIG. 9 is an axial section of a continuously variable automatic transmission according to a fourth embodiment of the invention.

The embodiment shown in FIGS. 7 and 8 is similar to that of FIG. 1 with the exception that the shafts 70' on which are mounted the weights 71' are inclined to the perpendicular and that the washer 60' and spring 61' abut against a key 91 rather than against the end of an enlarged portion of shaft 52'.

Figure 6:
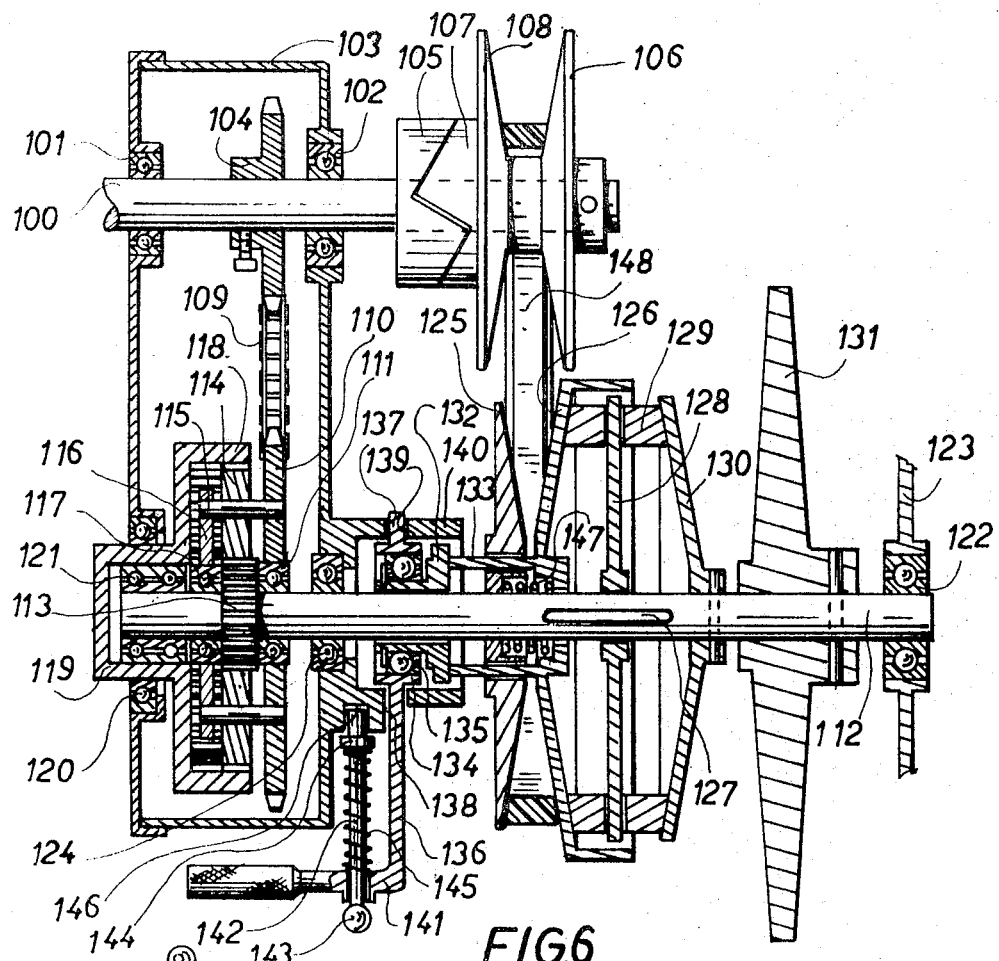
FIG. 6 is an axial section of a continuously variable automatic transmission according to a second embodiment of the invention.

Referring to FIG. 6, the embodiment shown therein comprises an input shaft 100 journalled in a spaced pair of ball bearings 101 and 102 mounted on the transmission casing 103. Shaft 100 carries rigid therewith a sprocket wheel 104, a torque responsive element 105 and a pulley flange 106 and slidable thereon a matching torque responsive element 107 secured to a second pulley flange 108.

A chain 109 connects sprocket wheel 104 to another sprocket wheel 110 journalled by a ball bearing 111 to an auxiliary shaft 112 which has secured thereon a sun gear 113. Sprocket wheel 110 constitutes a carrier for a plurality of planet gears 114 meshing with sun gear 113 and journalled on shafts 115 secured to the sprocket wheels 110 and to a carrier plate 116, also journalled on shaft 112 by a ball bearing 117.

An internal gear 118 meshes with planet gears 114 and is integral with an output shaft 119 journalled in a ball bearing 120 mounted on the casing 103. The interior of shaft 119 has mounted in it a ball bearing 121 in which is journalled one end of auxiliary shaft 112. The other end of the shaft 112 is journalled in a ball bearing 122 mounted on a transmission casing portion 123. Intermediate its ends the shaft 112 is further journalled in a ball bearing 124 mounted on the transmission casing 103.

The auxiliary shaft 112 has rigidly mounted thereon a pulley flange 125 as well as an axially slidable but rotationally fixed pulley flange 126 which engages a keyway 127 in the shaft. Also, axially slidable but rotationally fixed on the shaft 112 by means of the same keyway 127 is a mount 128 with a plurality of radially slidable weights 129 engageable with the back of pulley flange 126 and with an additional flange 130 rigid with the shaft 112. This shaft further carries rigid therewith a flywheel 131 and a sleeve 132 which abuts a number of fingers 133 rigid with the slidable pulley flange 126 and passing through holes in the fixed pulley flange 125. Sleeve 132, which is slidable and rotatable with on shaft 112, carries a ring 134 journalled thereon by a ball bearing 135. The ring 134 has rigid therewith an arm 136 and a guide pin 137 slidable in helical slide slots 138 and 139 on opposite sides of a tubular casing portion 140.

Arm 136 has a bent portion 141 in which is slidably mounted a pin 142 having a knob 143 at its outer end and a flange 144 near its inner end. A compression coil spring 145 surrounds pin 142 and urges against the flange 144 and against arm portion 141 to force the pin 142 towards the casing portion 140 and into engagement with a recess 146 in said casing portion, adjacent slot 139.

A compression coil spring 147 is located between the fixed pulley flange 125 and the slidable pulley flange 126 to urge the flanges away from each other. A V-belt 148 rides on pulleys 106-108 and 125-126.

As in the first embodiment, the speed of sun gear 113 is jointly controlled by the setting of arm 136 and by the action of weights 129. The setting of arm 136 and consequently of sleeve 132 determines the minimum spacing between pulley flanges 125 and 126, while wider spacings are produced by the weights 129 being driven by engine speed to a greater or lesser distance from the center according to engine speed. Return of the weights to the center is produced by the spring 147 pressing against the pulley flange 126. As in the first embodiment, the torque responsive elements 105–107 give or take up slack from the V-belt 148 and control, in accordance with the load, the spacing of pulley flanges 125, 126. The flywheel 131 produces quicker starts by adding its inertia to the slowing down of the sun gear speed.

In the embodiment of FIGS. 9–12, an input shaft 150 is connected by a centrifugal clutch 151 to a shaft extension 152 journalled in transmission casing 153 by a pair of ball bearings 154 and 155. Two sprocket wheels 156 and 157, of different size, are separately journalled on shaft extension 152.

Figure 10:
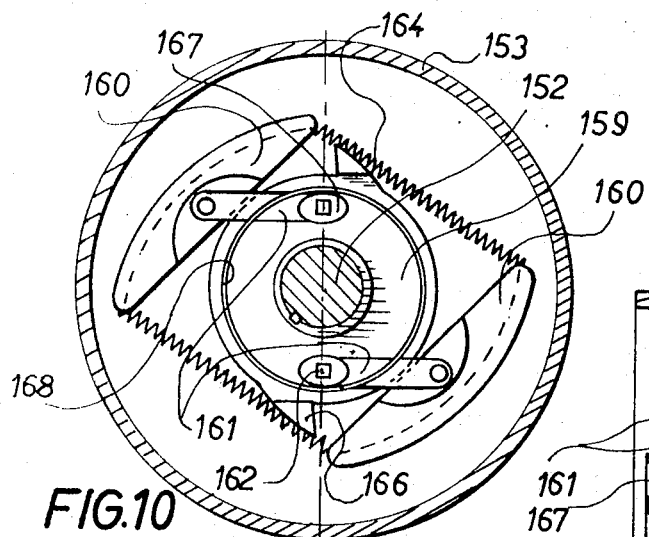
FIG. 10 is a fragmentary cross-section on line 10—10 of FIG. 9, showing a centrifugal clutch in disengaged position.
Figure 12:
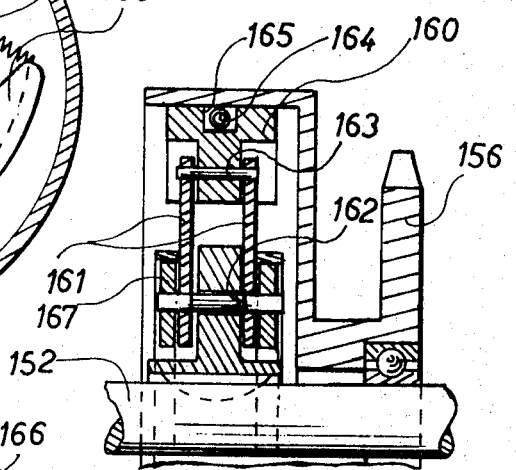
FIG. 12 is an axial section on line 12—12 of FIG. 11.
Figure 11:
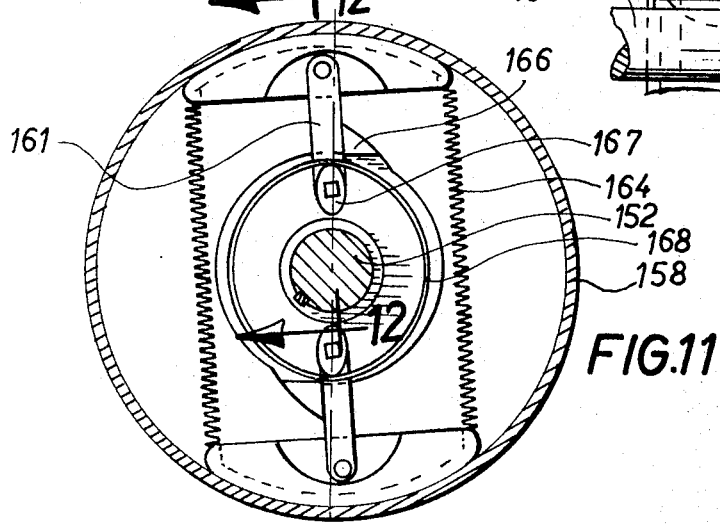
FIG. 11 is a fragmentary cross-section on the same plane of FIG. 10, showing the clutch in engaged position.

The larger sprocket wheel 156 is rigidly connected to the drum 158 of a centrifugal clutch, shown in FIG. 10–12, which comprises in the interior of the drum 158 a hub 159 keyed to shaft 152 and a pair of weighted shoes 160 connected to the hub by two pairs of parallel links 161 pivoted both to the hub by two pairs of parallel links 161 pivoted both to the hub and to the shoes by shafts 162 and 163 respectively. An endless coil spring 164 is wrapped around the shoes 160 and lies in grooves 165 in the shoe faces; the spring 164 urges the shoes 160 into central disengaged position. The hub 159 further comprises opposite stops 166 to limit the pivotal movement of links 161, as indicated in FIG. 11. Shafts 162 are squared at both ends and the links 161 are carried on the squared portions together with elliptical cams 167 which are surrounded by circular leaf springs 168 on either side of hub 159. The effect of cams 167 and leaf springs 168 is to produce declutching at a lower speed than that at which clutching occurs.

Figure 13:
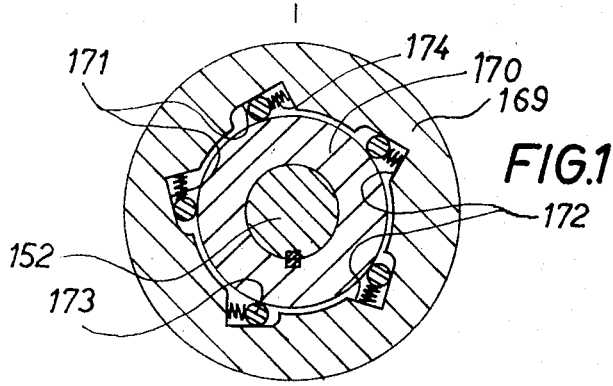
FIG. 13 is a fragmentary cross-section on line 13—13 of FIG. 9, showing a unidirectional clutch.

The smaller sprocket wheel 157 is rigidly connected with the rim 169 of a unidirectional clutch illustrated in FIG. 13 and comprising in the interior thereof a hub 170 keyed to shaft 152. The interior of rim 169 is provided with recesses having outer walls 171 of shallow inclination and lateral walls 172 of steeper inclination and containing balls 173 which are urged by springs 174, pressing against lateral walls 172, into the wedge-shaped space defined by outer walls 171 and hub 170. The effect is that when the hub 170 rotates in counter-clockwise direction with reference to FIG. 13, balls 173 get wedged in the recesses and rim 169 is driven by the hub 170; yet the rim 169 can override the hub and rotate freely at a higher speed than the same.

Sprocket wheels 156 and 157 are connected by chains 175 and 176 respectively to a pair of identical size sprocket wheels 177 secured to a carrier 178 journalled to an auxiliary shaft 179 and having planet gears 180 mounted thereon. A sun gear 181 is rigidly mounted on the auxiliary shaft 179 and meshes with planet gears 180. The latter mesh in turn with an internal gear 182 rigid with an output shaft 183 which is journalled to the transmission casing 153 by a bearing 184. Auxiliary shaft 179 is journalled in a bearing 185 mounted to the interior of internal gear 182 and in a bearing 186 mounted in the transmission casing 153.

The transmission further comprises an expansible pulley V-belt arrangement with centrifugal control and manual selection similar to the one illustrated in FIG. 6, which differs therefrom only in that the flywheel 131 is omitted and knob 143 is replaced by a release lever 187. The description of the above-mentioned arrangement need therefore not be repeated.

The combination of the centrifugal clutch 158-168 and unidirectional clutch 169-174 operates as follows. At low engine speed with centrifugal clutch in declutched condition, shaft 152 drives carrier 178 through hub 170, balls 173, rim 169, sprocket wheel 157, chain 176 and sprocket wheel 177 at a relatively lower rate of speed. As the engine speed increases, the shoes 160 engage the drum 158 of the centrifugal clutch, so that shaft 152 drives carrier 178 through sprocket wheel 156, chain 175 and the other sprocket wheel 177 at a relatively higher rate of speed, while the rim 169, which is driven through chain 176 at a higher speed than hub 170, overrides the same. The arrangement thus automatically provides a double speed range depending on engine speed. The described cam and spring arrangement 167-168 maintains the higher range as engine speed drops, to compensate for the assistance derived from inertia.

Although throughout the specification the input shaft has been described as being connected to the carrier, the output shaft connected to the internal gear and the continuously variable driving means connected to the sun gear, it is obvious that these connections could be changed, namely that the input shaft could be connected to anyone of the carrier, the internal gear and the sun gear, and that the same applies to the output shaft and that the continuously variable driving means can be connected to the remaining one of the three above-mentioned elements of the planetary gear train.

Also, as in applicant's U.S. Pat. No. 3,641,843 of Feb. 15, 1972, it is not essential that a planetary gear train be used; but the same invention applies to using any type of differential gear train.

What I claim is:

1. A continuously variable automatic transmission comprising an input shaft, a differential gear train having first gear means, second gear means, and third gear means, a proportional speed drive operatively connected between said input shaft and one of said first, second, and third gear means to rotate the same, a continuously variable V-belt drive operatively connected between said input shaft and another one of said first, second, and third gear means and including one expansible pulley operatively connected to said input shaft, another expansible pulley connected to said another one of said first, second, and third gear means, and a V-belt running on said pulleys, each of said expansible pulleys comprises a pair of flanges, one flange of each respective pulley on opposite sides of said V-belt being axially displaceable, the other flange of each respective pulley on opposite sides of said V-belt being axially fixed, an output shaft connected to the last one of said first, second and third gear means, centrifugal control means connected to said one axially displaceable flange of said one expansible pulley and to said input shaft and responsive to the rotational speed of the latter to continuously vary the speed ratio of said continuously variable V-belt drive as a function of said rotational speed, resilient means between said flanges of said one pulley urging the flanges thereof apart, and torque responsive cam means connected to the displaceable flange of said another pulley urging said flanges towards each other, said centrifugal control means comprising a plurality of weights in cam relation with the side of said displaceable flange of said one pulley opposite said V-belt, and a mount radially slidably mounting said weights.

2. A continuously variable automatic transmission according to claim 1, further including manual control means, connected to said mount, the latter being axially slidable with respect to said displaceable flange of said one pulley and axially shiftable by actuation of said manual control means, whereby to select ranges of speed ratios.

3. A continuously variable automatic transmission according to claim 2, wherein said differential gear train is a planetary gear train, said first gear means is a sun gear, constituting said another one of said gear means, said second gear means is a carrier constituting said one of said gear means and carrying a plurality of planet gears meshing with said sun gear, said third gear means is an internal gear constituting said last one of said gear means and meshing with said planet gears, said manual selector means is constructed and arranged to set said V-belt drive to drive said sun gear at a speed equal to the speed of said carrier multiplied by the sum of the gear tooth ratio of said internal gear to said sun gear plus one, where upon said internal gear is at a standstill and the transmission is in neutral setting, and to drive said sun gear at decreased speeds determining a forward drive setting and at increased speeds determining a reverse drive setting.

4. A continuously vsriable automatic transmission according to claim 1, wherein said differential gear train is a planetary gear train having a sun gear, a carrier with a plurality of planet gears meshing with said sun gear and an internal gear meshing with said planet gears, a first and a second sprocket wheels are connected to said planet carrier for rotation therewith, a unidirectional clutch and a centrifugal clutch are mounted on said input shaft, a third sprocket wheel is connected to said unidirectional clutch, a fourth sprocket wheel is connected to said centrifugal clutch, a first chain connects said first sprocket wheel to said third sprocket wheel, a second chain connects said second sprocket wheel to said fourth sprocket wheel, and the transmission ratio of said third sprocket wheel to said first sprocket wheel is smaller than the transmission ratio of said fourth sprocket wheel to said second sprocket.

5. A continuously variable automatic transmission according to claim 2, wherein said manual selector means comprises a sleeve rotatable together with said displaceable flange of said one pulley and axially slidable with respect to both flanges of the latter, means associated with said sleeve and engageable with said displaceable flange of said one pulley to displace the same axially, a ring rotatably mounted and axially fixed on said sleeve, and an arm connected to said ring to displace said sleeve.

6. A continuously variable automatic transmission according to claim 5, wherein said transmission comprises a fixed casing having one helical slide slot for said arm causing axial movement of said ring and said sleeve when said arm is moved along said one slide slot.

7. A continuously variable automatic transmission according to claim 6, wherein said arm is rigidly connected to said ring, the latter comprises a guide pin rigidly connected thereto opposite said arm, and said fixed casing has another helical slide slot for said pin opposite and of the same inclination as said one slide slot.

8. A continuously variable automatic transmission according to claim 7, wherein said manual selector means further comprises a lock operatively connected between said arm and said casing to lock said arm in neutral setting position.

9. A continuously variable automatic transmission according to claim 8, wherein said lock comprises a pin slidably mounted on said arm, a recess in said casing adjacent said another slide slot to receive said pin, a spring urging said pin in engagement with said recess and a handle connected to said pin to move said pin out of engagement with said recess.

10. A continuously variable automatic transmission according to claim 9, wherein said sleeve and said mount are constituted by a single element located on the same side of said displaceable flange of said one pull as said sleeve, and an additional flange is secured to said displaceable flange of said one pulley and forms therewith an enclosure for said centrifugal weights and the latter are constructed and arranged in camming relationship with said additional flange and constitutes means to axially displace said displaceable flange of said one pulley.

11. A continuously variable automatic transmission according to claim 10, wherein said weights are mounted on said mount for partly axially inclined radial sliding movement.

12. A continuously variable automatic transmission according to claim 9, wherein said sleeve is located on the side of said fixed flange of said one pulley opposite said displaceable flange thereof and is operatively connected thereto by a plurality of fingers traversing said fixed flange of said one pulley.

13. A continuously variable automatic transmission according to claim 12, wherein said fingers are secured to said displaceable flange of said one pulley and butt against said sleeve.

14. A continuously variable automatic transmission according to claim 13, wherein an additional flange is disposed on the side of said displaceable flange of said one pulley opposite said fixed flange, and is axially fixed with respect to the latter, and said displaceable flange of said one pulley and said additional flange enclose said weights therebetween, in cam relation with said additional flange.

15. A continuously variable automatic transmission according to claim 14, further comprising a flywheel operatively connected to said sun gear.

16. A continuously variable automatic transmission according to claim 4, wherein said two carrier sprocket wheels are of the same size and said unidirectional clutch sprocket wheel is smaller than said centrifugal clutch sprocket wheel.

17. A continuously variable automatic transmission according to claim 16, wherein said centrifugal clutch comprises a drum connected to said fourth sprocket wheel associated therewith, a hub connected to said input shaft, a pair of opposite weighted plates, parallel links pivoted to said plates and to said hub, resilient means interconnecting said plates and urging them for centering action thereon towards said hub, and cam and spring means connected to said links and arranged to resist the centering action of said resilient means on said plates until the input shaft speed falls to a value lower than that required to move said clutch plates into engagement with said drum.

18. A continuously variable automatic transmission according to claim 1, further including a centrifugal clutch connected to said input shaft and arranged to accelerate the latter.

19. A continuously variable automatic transmission according to claim 1, further including a centrifugal clutch and a unidirectional clutch mounted onto said input shaft to be driven by the latter, and each having an output means and connected to said planet carrier and constructed and arranged to independently drive the latter.

* * * * *

UNITED STATES PATENT OFFICE
CERTIFICATE OF CORRECTION

Patent No. 3,850,050               Dated November 26, 1974

Inventor(s)    Joseph Lemmens

It is certified that error appears in the above-identified patent and that said Letters Patent are hereby corrected as shown below:

On the cover sheet item [76] "John Lemmens" should read -- Joseph Lemmens --.

Signed and sealed this 21st day of January 1975.

(SEAL)
Attest:

McCOY M. GIBSON JR.            C. MARSHALL DANN
Attesting Officer               Commissioner of Patents